United States Patent [19]

Lederman

[11] Patent Number: 5,172,984
[45] Date of Patent: Dec. 22, 1992

[54] VENTING END CAP FOR VEHICLE WHEEL BEARING

[75] Inventor: Frederick E. Lederman, Sandusky, Ohio

[73] Assignee: General Motors Corporation, Detroit, Mich.

[21] Appl. No.: 767,444

[22] Filed: Sep. 30, 1991

[51] Int. Cl.⁵ .................................... F16C 33/78
[52] U.S. Cl. .................................... 384/489
[58] Field of Search ............ 384/489, 131, 130, 477; 277/50, 134

[56] References Cited

U.S. PATENT DOCUMENTS 3,003,834  10/1961  Pendleton .
3,169,809   2/1965  Pendleton .
3,642,327   1/1972  Walther ........................ 301/108 R
4,368,933   1/1983  Motsch ............................. 384/489
4,399,998   8/1983  Otto ................................. 277/134
4,421,326  12/1983  Drygalski ........................... 277/50
4,960,335  10/1990  Otto et al. ....................... 384/489

Primary Examiner—Lenard A. Footland
Attorney, Agent, or Firm—Patrick M. Griffin

[57] ABSTRACT

A venting feature is incorporated integrally into a molded plastic wheel bearing end cap. The cap is flexible, and responds to pressure changes by bulging out or contracting in. As it does so, an internal sealing lip is either bent away, or pulled away, from the inner surface of the bearing hub, thereby opening up venting ports to the outside. After the pressure equalizes, the cap returns to its free state, and the lip again blocks off the ports.

2 Claims, 5 Drawing Sheets

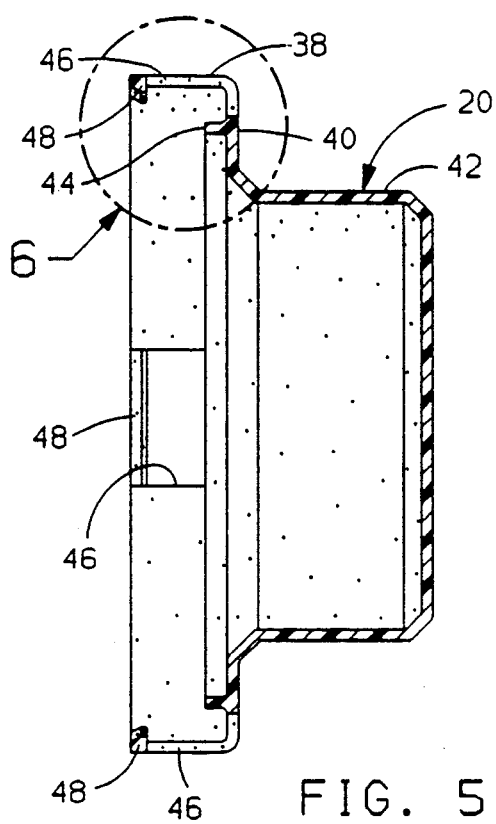
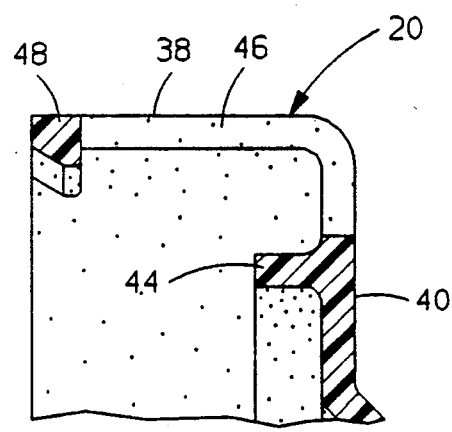
FIG. 6
FIG. 5
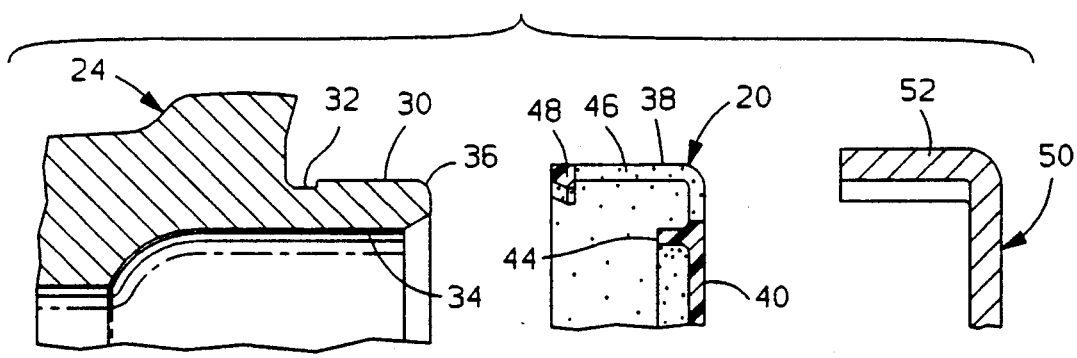
FIG. 7
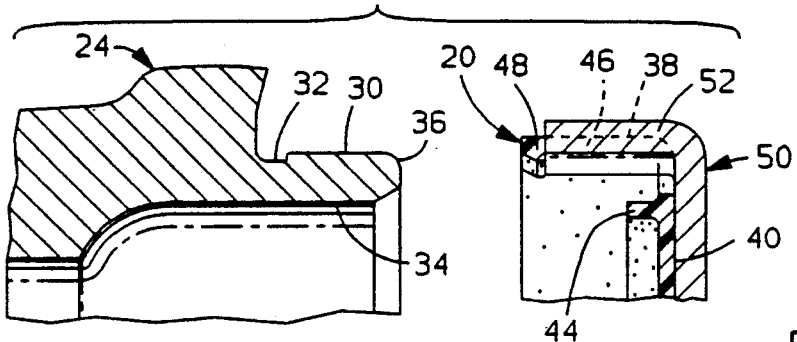
FIG. 8

VENTING END CAP FOR VEHICLE WHEEL BEARING

This invention relates to vehicle wheel bearings in general, and specifically to a self venting end cap for a wheel bearing.

BACKGROUND OF THE INVENTION

Vehicle wheel bearings include an inner race, often called a spindle, and a surrounding outer hub. Either the spindle or hub may be attached to the wheel, while the other is mounted to the vehicle suspension. The wheel may be powered or trailing. If trailing, then there is no need for a drive shaft to extend through the spindle, and the spindle can terminate at its inner end substantially even with the annular end face of the hub. It is most convenient to close that side of the bearing with a cup shaped end cap, stamped of metal or molded from a tough plastic material. The end cap is tightly press fitted to the hub, but does not touch the spindle, and so provides a complete seal with no friction and no moving interfaces to leak. The other side the bearing, where the spindle is attached to the rotating wheel, must be sealed with a rubbing seal.

The sealed internal volume of a wheel bearing is subject to pressure changes relative to the ambient or outside pressure. The bearing heats up as it runs, and also absorbs heat from the brake system, increasing the internal pressure. If the bearing blows off excess pressure while it is hot, then it can develop a pressure depression later, as it cools. It is desirable to equalize these pressure differentials, if possible. The rubbing seals in wheel bearings have flexible seal lips that make a line contact with a cylindrical seal surface. Since the seal lip is not attached to the sealing surface on which it rubs, it is fairly simple to mold some means into the seal lip, such as a fulcrum pad, to pry the lip up and vent excess pressure from the bearing. These designs are generally not able to breath in to relieve a negative pressure, however, since an air inflow would tend to shut the lip more tightly, rather than to lift it. Furthermore, the pads tend to wear away with time.

A typical end cap, which is stiff and tightly fitted to the hub, does not lend itself to the kind of lift and return venting that a flexible rubbing seal lip does. It would be possible to simply mount existing venting valves to the end cap, but that would add expense and extra manufacturing steps. An end cap that incorporated a vent means within its basic structure would be desirable, especially if it added no cost or complexity to the manufacture and installation of the end cap.

SUMMARY OF THE INVENTION

The invention provides a molded plastic bearing end cap that has an integral venting feature, and which can be manufactured and installed as easily as a conventional end cap.

The end cap is a one-piece injection molded unit with a stepped cylindrical shape. The greatest diameter is an outer wall that is fixed to the cylindrical outer surface of the hub. The outer wall steps down across an annular web to an inner cylindrical wall that surrounds the end of the spindle without touching it. In the preferred embodiment disclosed, the outer wall is held in place by four molded latch barbs, which are trailed by four mold access slots that cut axially through the outer wall and through the web. Besides providing molding access to the barbs, the slots also interfit with an installation tool used to push the cap in place. Extending axially inwardly from the inner surface of the web is a continuous seal lip, which is radially inboard of the slots. The seal lip tightly contacts the inner surface of the hub, but only when the bearing internal pressure is close to ambient and the cap is in an unflexed condition. The slots are then blocked off from the interior volume of the bearing, and the seal is complete.

The material from which the end cap is molded is flexible enough that the inner wall bulges outwardly in response to an internal pressure increase. This pushes axially outwardly on the web, as well, bending it out relative to the fixed outer wall. The bending of the web causes the sealing lip that it carries to go conical, pulling away from the inner surface of the hub and opening the slots to the bearing interior, which then provide venting ports to the outside. The venting occurs quickly, and the end cap rapidly returns to its unflexed, closed condition. Later, when the bearing interior cools and a depressed pressure occurs, the greater outside pressure on the end cap inner wall causes it to contract radially inwardly. This pulls radially inwardly on the web, which is held by the outer wall, putting it in tension. The web is sufficiently elastic that it can stretch to an extent, enough to pull the sealing lip away from the inner hub surface. The bearing interior space is again opened to the slots, this time admitting outside air until the pressure returns to normal and the sealing lip closes.

It is, therefore, a general object of the invention to provide a vehicle wheel bearing with an end cap in which a pressure equalization feature is integrated into the structure of the cap itself.

It is another object of the invention to provide a bearing end cap in which the overall response of the end cap to a pressure differential causes an integral vent means to open and close.

It is still another object of the invention to provide such an end cap in the shape of a stepped cylinder with an outer wall fixed to the hub, an inner wall that expands and contracts in response to pressure change, and a sealing lip that moves in response to the relative motions of the inner and outer walls to block and unblock vent ports in the cap.

It is another object of the invention to provide such a bearing cap in which the molding process used to create a mounting latch also leaves behind slots that are specially designed to serve as vent ports.

It is yet another object of the invention to provide such an end cap in which a special installation tool cooperates with the end cap and the slots to assist in installing the end cap to the bearing.

DESCRIPTION OF THE PREFERRED EMBODIMENT

These and other objects and features of the invention will appear from the following written description, and from the drawings, in which:

FIG. 5 is a cross section of the end cap alone;

FIG. 6 is an enlargement of that portion of the end cap circled in FIG. 5;

FIG. 7 is a view of those portions of the hub and end cap shown in FIGS. 2 and 6, and a respective portion of an installation tool;

FIG. 8 is a view of end cap inserted onto the installation tool, just prior to installation;

Figure 1:
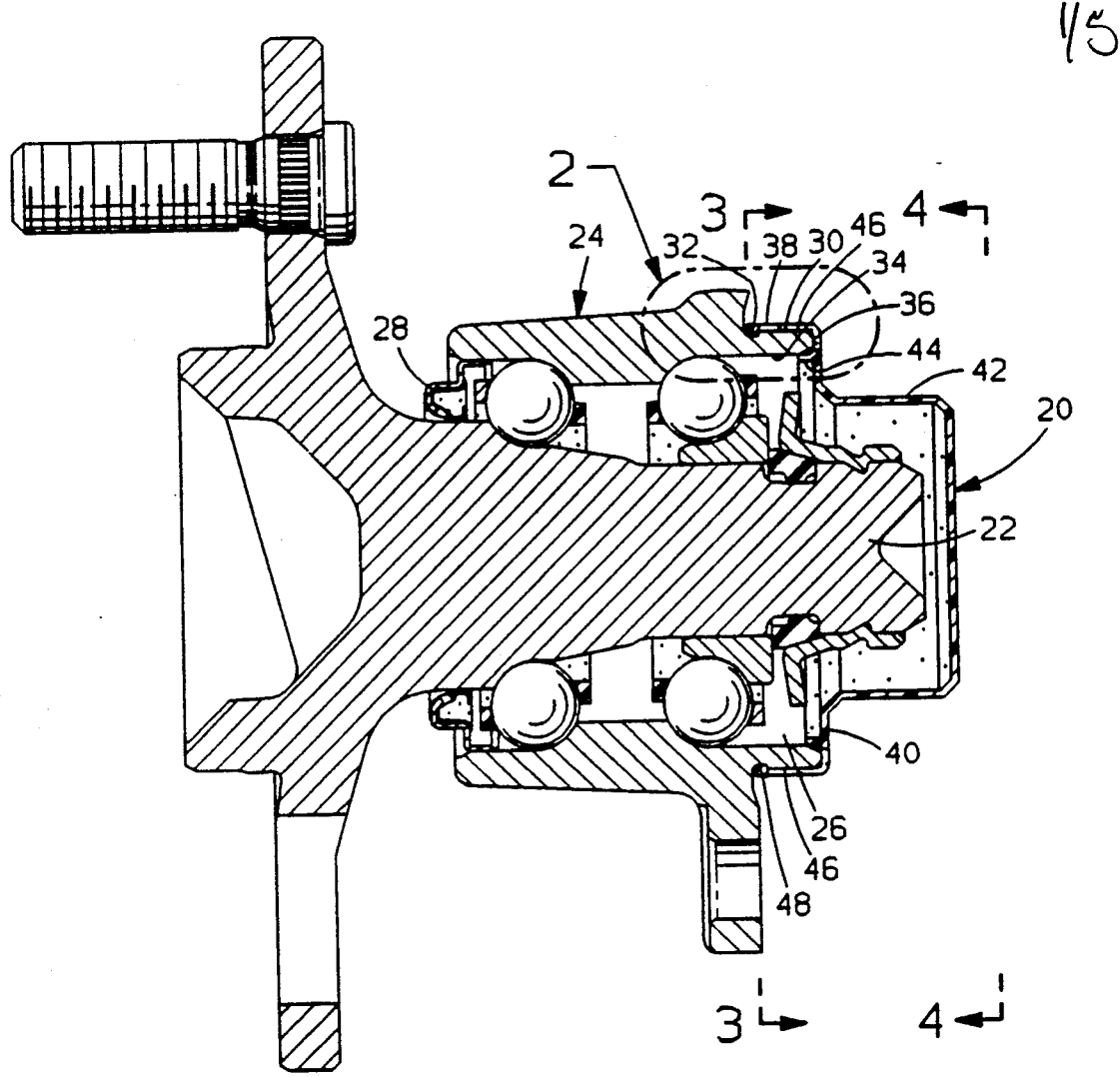
FIG. 1 is cross sectional view of a vehicle wheel bearing incorporating a preferred embodiment of the venting end cap of the invention, in a condition where the bearing internal pressure is close to the outside pressure.
Figure 2:
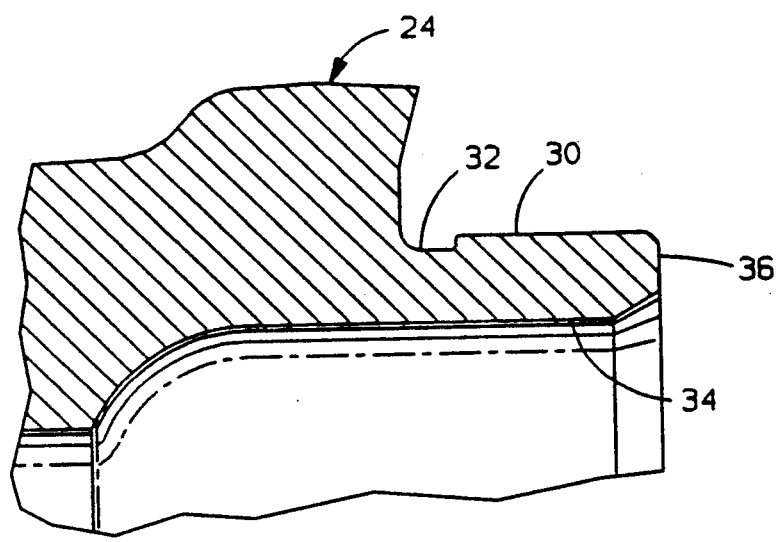
FIG. 2 is an enlargement of the circled portion of the hub of FIG. 1, without the end cap.
Figure 3:
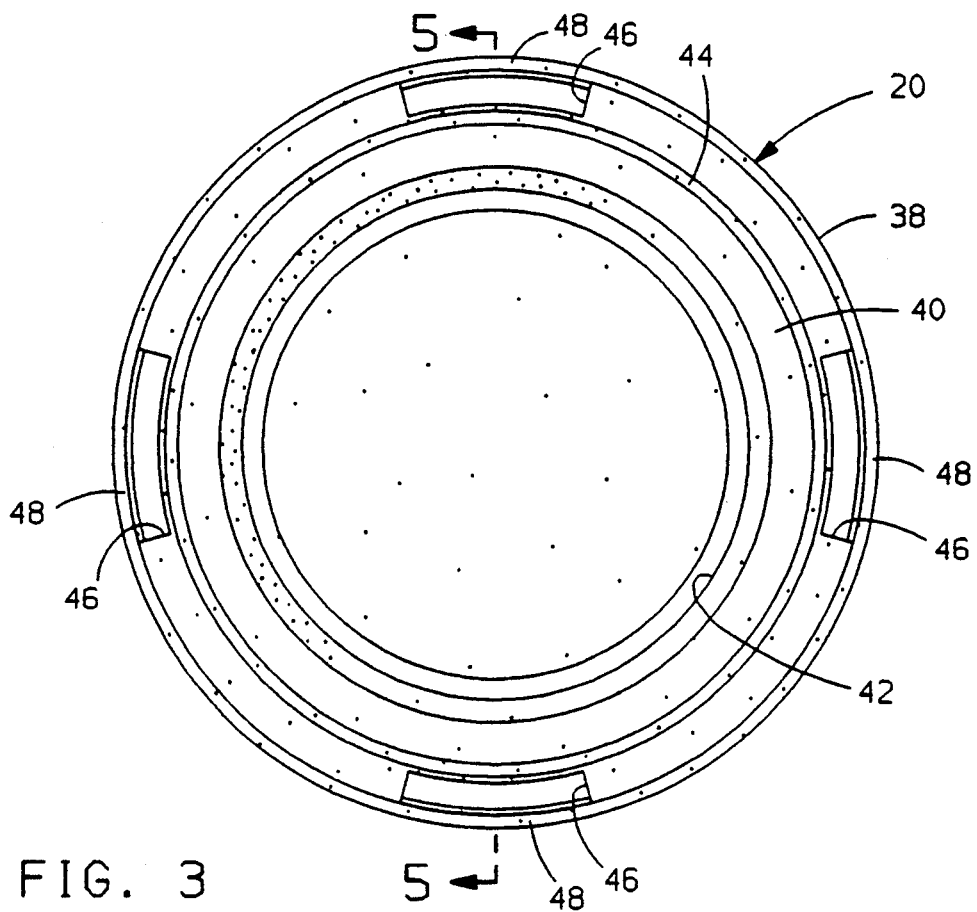
FIG. 3 is an inner axial view of the end cap alone.
Figure 4:
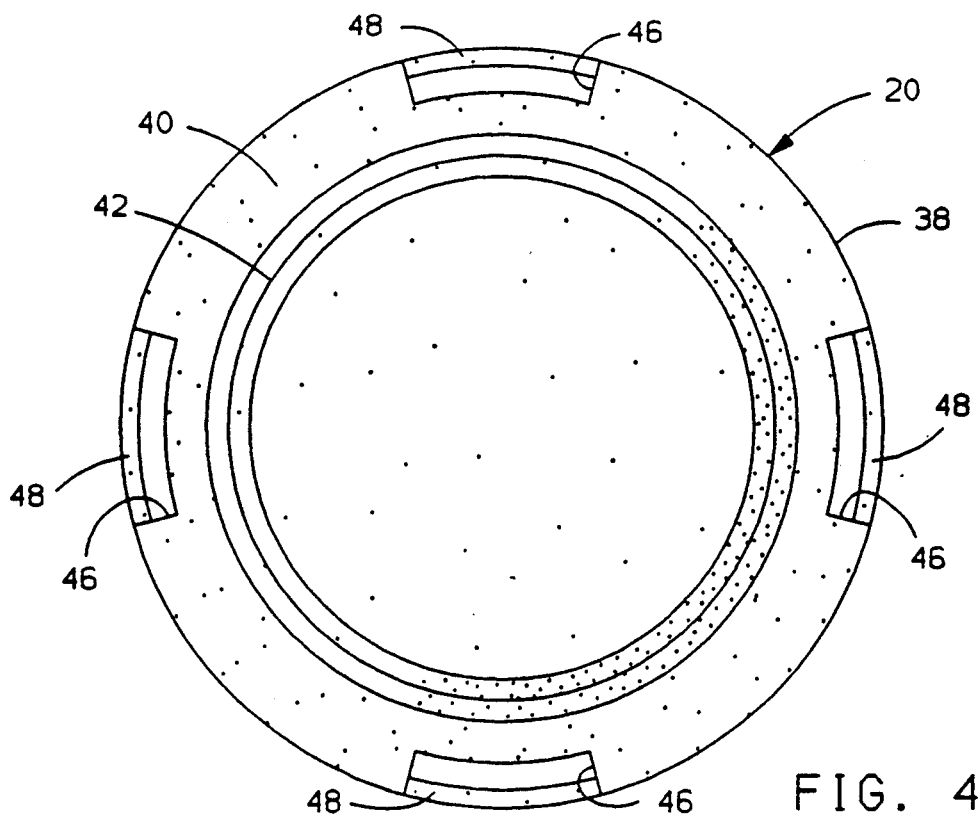
FIG. 4 is an outer axial view of the end cap alone.

Referring first to FIGS. 1 and 2, a preferred embodiment of the end cap of the invention, indicated generally at 20, is incorporated in a vehicle wheel bearing that includes a rotatable inner spindle 22 and a surrounding outer hub, indicated generally at 24. Spindle 22 and hub 24 define an interior bearing space 26, which contains a significant volume of air and lubricant. At high speeds, internal friction generates heat, and outside heat is also conducted into space 26 from the brake rotor, not illustrated. Internal heating causes a pressure rise in space 26 relative to the outside or ambient pressure, due both to heating of the air and to gases released from heated lubricant. One side of space 26 is sealed by a conventional rubbing seal 28, which does not include any provision for overpressure relief. The other side is closed and sealed by end cap 20, which does. FIG. 2 shows some structural detail of hub 24, which cooperates with end cap 20 in both its installation and operation. A cylindrical outer surface 30 ends in a circular groove 32. Outer surface 30 and a coaxial inner surface 34 border a chamfered annular end face 36. A typical hub 24 will already have most of these various surfaces, although groove 32 would probably have to be added, and inner surface 34 might have to be machined more finely than usual in order to work successfully with end cap 20.

Referring next to FIGS. 3 through 6, the structural details of end cap 20 are illustrated, which is shown in its free state or unflexed condition. End cap 20 is a stepped cylindrical cup, injection molded with a thin cross section of nylon or similar plastic material. Particularly suitable would be some of the newer nylon compositions that can be stretched and strained farther than normal, and still rebound to their original shape. The outermost diameter of cap 20 is defined by an outer cylindrical wall 38, the inner surface of which has a diameter that closely matches the hub outer surface 30. Wall 38 merges across an annular web 40 into an inner wall 42 that has a larger diameter than the end of spindle 22. Extending axially inwardly from the inner surface of web 40 is a continuous, circular sealing lip 44, the outer diameter of which is slightly less than hub inner surface 34. Web 40 is interrupted at four evenly spaced locations by slots 46, which are relatively wide, subtending about 15 degrees each. The slots 46 also cut through most of the length of outer wall 38, extending axially all the way up to the back of four arcuate latching barbs 48. The latching barbs 48 are wide enough to fill groove 32, but narrow enough not to overlap lip 44.

Still referring next to FIGS. 3 through 6, the configuration of the slots 46 can be explained in terms of the process by which cap 20 is molded, as well as by their other functions. Cap 20 is molded by the so called bypass or axial draw technique, in which only two molds, which close and part along the central axis of cap 20, are necessary to form all of its surfaces. This is possible because none of the exterior surfaces of cap 20, except the back of the barbs 48, radially overlaps any other surface. Even there, overlap is effectively prevented by the presence of the slots 46, so that their is nothing directly behind the back of the barbs 48. One of the molds would have axial extensions machined into it that matched the size of slots 46. The ends of these mold extensions would "pass by" the other mold as they closed, and would form the back of barbs 48. Therefore, cap 20 is no more expensive or difficult to mold than a conventional one-piece cap. While the slots 46 are, in some sense, merely a residue of the molding process, they are more than that, as they are deliberately made radially wider than would be necessary just to allow the back surfaces of the barbs 48 to be molded. They are also located entirely radially outboard of the continuous sealing lip 44, for a reason described below.

Referring next to FIGS. 7 and 8, the initial step in the installation of cap 20 is illustrated. Cap 20 is, because of its material and thin cross section, inherently flexible. This could make press on installation difficult, as compared to a conventional, stiffer cap. That is, a stiff metal or plastic cap could have a pressing force applied to it at one or more discrete points without collapsing or changing shape. An inherently flexible cap like 20 would not be as easily pushed on. However, a special installation jig or tool is provided, indicated generally at 50, which is shaped to conform closely to the outside of cap 20 and hold it. Tool 50 also has four fingers 52 sized to fit closely into the slots 46 and abut the back of the barbs 48, much as the mold extensions that formed the barbs 48 would have. Thus, cap 20 is rigidly and securely supported against localized flexing or twisting, and the pressing force of tool 50 is evenly distributed.

Figure 9:
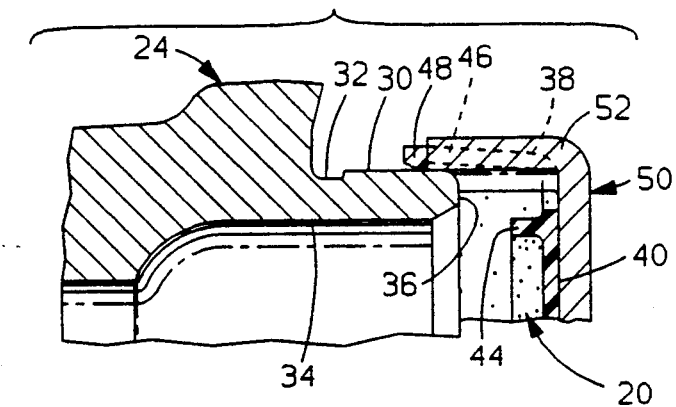
FIG. 9 is a view showing the end cap partially installed by the tool.
Figure 10:
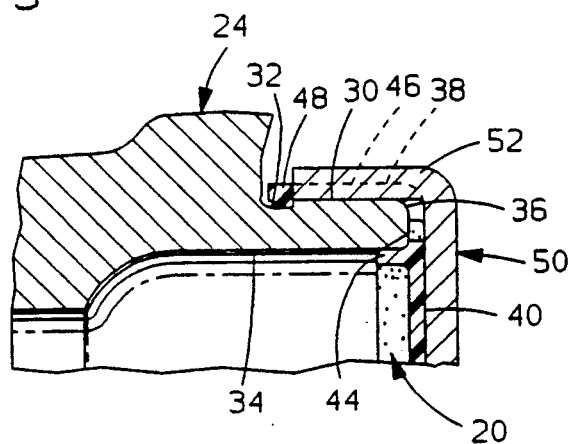
FIG. 10 is a view showing the end cap fully installed, before the installation tool is pulled off.
Figure 11:
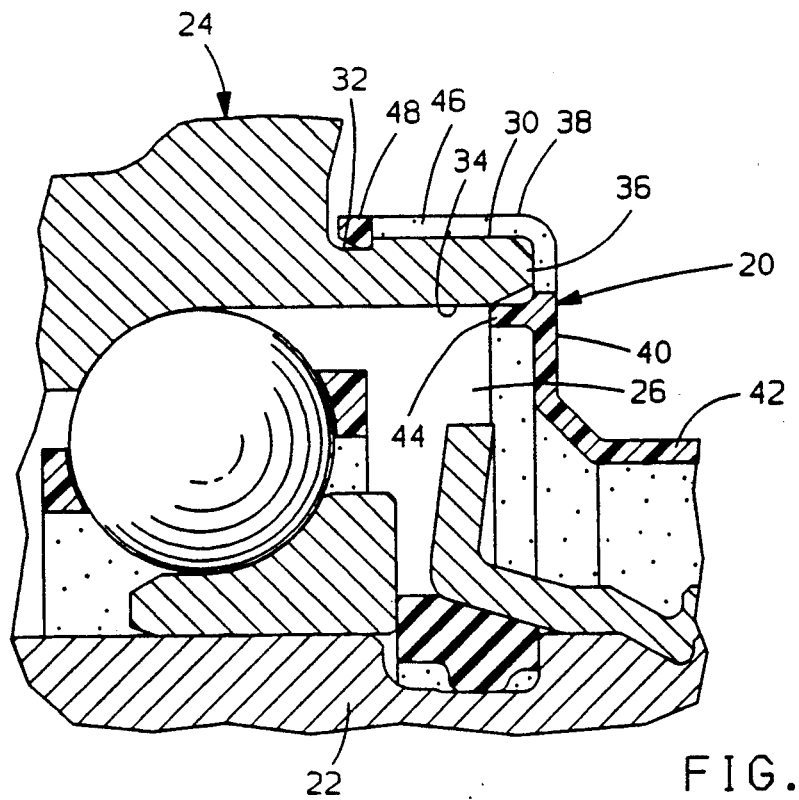
FIG. 11 is a view like 10, but showing the tool pulled off.

Referring next to FIGS. 9 trough 11, tool 50 and cap 20 are aligned with hub 24 and axially advanced. The barbs 48 engage the chamfered hub end face 36 and flex radially outwardly as cap outer wall 38 slides closely over hub outer surface 30. As cap 20 is being pushed on, the slots 46 remain open to the bearing interior space 26, providing an air outlet. This prevents the accumulation of back pressure that can retard the installation of a conventional end cap, which is analogous to pushing a stopper into a bottle. Finally, the barbs 48 snap into hub groove 32, as shown in FIG. 10, at which point the sealing lip 44 moves into snug, continuous contact with the hub inner surface 34. Tool 50 is then removed, leaving cap 20 securely latched in place, as shown in FIG. 10. As best seen in the enlarged FIG. 11, sealing lip 44 touches hub inner surface 34 just axially inboard of the chamfered end face 36, so the slots 46 are completely shut off and sealed from the bearing space 26. Lip 44 stays in its closed condition so long as the pressure in space 26 remains near the outside pressure.

Figure 12:
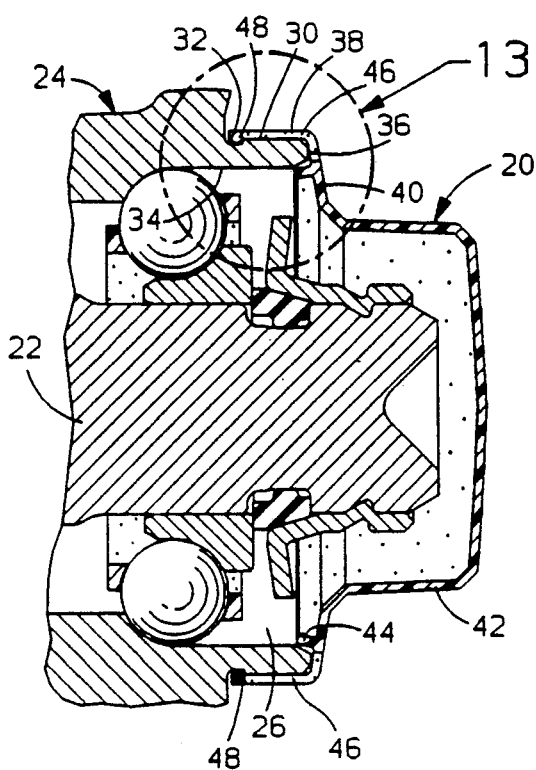
FIG. 12 is a view like FIG. 1, but showing the end cap response to an elevated internal pressure.
Figure 13:
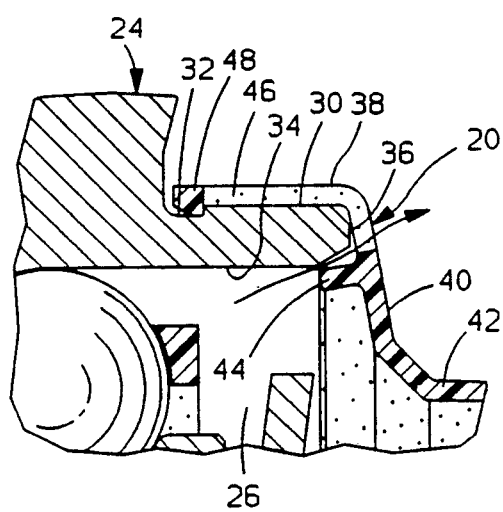
FIG. 13 is an enlargement of the circled portion of FIG. 12.

Referring next to FIGS. 12 and 13, the response of cap 20 to a pressure increase in bearing space 26 is illustrated. The entire body of cap 20 reacts by ballooning or bulging radially outwardly, especially its inner wall 42. Cap 20 is not blown off, however, because of the secure retention provided by the latch barbs 48. Outer wall 38 is prevented from moving to any significant extent by its tight fit over hub outer surface 30. However, the outward bulging of inner wall 42 does bend the web 40 outwardly about the fixed outer wall 38. This causes the sealing lip 44 to go slightly conical, tilting down and away from hub inner surface 34. Bearing space 26 is thereby opened to the slots 46, which provide venting ports to the outside for pressurized gas and air, as shown by the arrows. Lip 44 does not have to tilt very far inwardly to open a wide and unrestricted venting path, since its line of sealing contact is so close to the chamfered end face 36. Overpressure in space 26 is therefore quickly relieved through the relatively wide slots 46, after which cap 20 can quickly snap back to its original shape, again closing off the slots 46.

Figure 14:
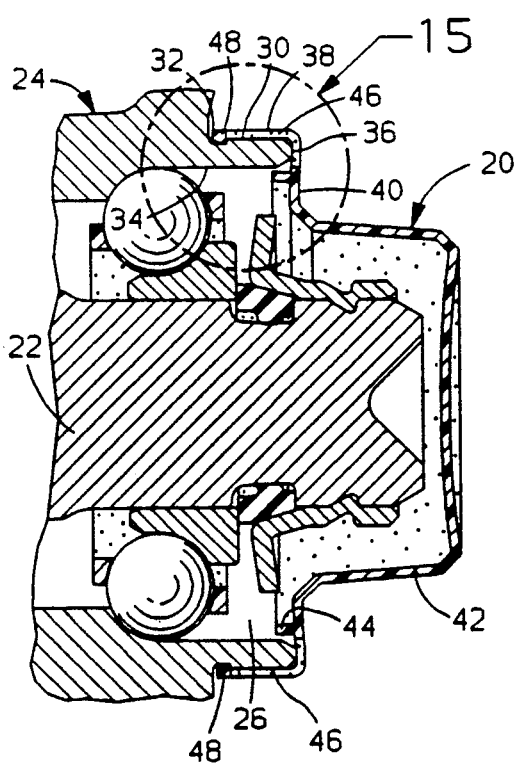
FIG. 14 is a view like FIG. 1, but showing the end cap response to a depressed internal pressure.
Figure 15:
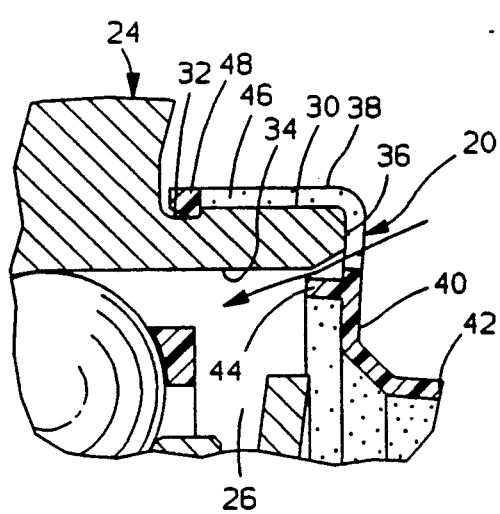
FIG. 15 is an enlargement of the circled portion of FIG. 14.

Referring next to FIGS. 14 and 15, the response of cap 20 to cooling of the bearing space 26 is illustrated. After some percentage of the original volume of air and gas has been vented, subsequent cooling causes a relative pressure drop in space 26. End cap 20 then contracts, dimpling in the center while the inner wall 42 shrinks radially inwardly. Outer wall 38 is unable to contract, because it is held by the hub outer surface 30. Consequently, the intermediate web 40 is stretched, and put into tension. The material from which cap 20 is molded, combined with its thinness, give web 40 enough elasticity that it can stretch to an extent. In addition, the removal of material from web 40 by the slots 46 concentrates the stress locally at those four points. Consequently, web 40 stretches enough, at least in the area just radially inboard of the slots 46, to pull the seal lip 44 radially in and away from hub inner surface 34. Therefore, contraction of cap 20, as well as expansion, opens bearing space 26 to the slots 46. Now, air can flow in the opposite direction, relieving the negative pressure. Once relieved, cap 20 snaps as quickly back to its original shape, closing off the slots 46 again.

Variations could be made in the embodiment disclosed. The discrete latch barbs 48 and backing slots 46 could be eliminated in favor of another latch means that left outer wall 38 uninterrupted. For example, a continuous inturned circular edge could be molded at the end of outer wall 38, which would snap into the hub groove 32. Molding a continuous inturned edge would mean that the molds could not part totally without resistance, since the inturned edge would radially overlap other cap surfaces, and would therefore have to snap past one of the molds when they parted. Nevertheless, such an inturned edge would not have to be wide, since it would fit in the groove 32 all the way around, and would give very secure cap retention. With no residual molding access slots 46, separate venting ports would have to be provided through the web 40, but these would not have to intrude into the outer wall 38 at any point. Such an alternative design would still provide the same internal pressure compensation function, as well as preventing back pressure during cap installation. Web 40 might have to be molded more thinly in order to be sufficiently elastic to allow lip 44 to pull away from surface 34, however, since there would be no slots like 46 to strategically concentrate the stress. All in all, the myriad functions provided by the slots 46, including molding access, installation tool support, installation back pressure prevention, internal pressure venting, and localized stress concentration, combined with the fact that they are essentially cost free to create, make them a highly desirable design feature. Therefore, it will be understood that it is not intended to limit the invention to just the embodiment disclosed.

I claim:
1. For use in a wheel bearing of the type having an inner spindle surrounded by a hub, said hub having a cylindrical outer surface and a cylindrical inner surface defining a bearing interior space that is subject to an internal pressure that changes relative to the outside pressure, a one-piece end cap that compensates for said pressure changes, comprising,
   a cylindrical outer wall fixed to said hub cylindrical outer surface,
   an elastic annular web integral with said outer cylindrical wall having a least one venting port formed therethrough,
   a cylindrical inner wall integral with said annular web that is sufficiently flexible to bulge outwardly from its unflexed condition in response to an internal pressure rise, thereby pulling axially outwardly on said web, and to contract in response to an internal pressure fall, thereby pulling radially inwardly on said web, and,
   a continuous internal seal lip on said web located radially inboard of said port and engaged closely with said hub inner surface when said cap is in its unflexed condition, thereby blocking said interior space from said venting port,
   whereby, when said internal pressure rises, said outwardly bulging inner wall bends said annular web axially outwardly about said fixed outer wall, thereby bending said seal lip away from said hub inner surface to open said venting port, and when said internal pressure falls, said radially contracting inner wall stretches said annular web radially inwardly from said outer wall, thereby pulling said seal lip radially inwardly from said hub inner surface to open said venting port.

2. A wheel bearing of the type that is subject to an internal pressure that changes relative the outside pressure, comprising,
   an inner spindle,
   an outer hub surrounding said spindle having a cylindrical outer surface and a cylindrical inner surface defining a bearing interior space,
   a one-piece end cap closing one side of said interior space, including,
   a cylindrical outer wall fixed to said hub cylindrical outer surface,
   an elastic annular web integral with said outer cylindrical wall having a least one venting port formed therethrough,
   a cylindrical inner wall integral with said annular web that is sufficiently flexible to bulge outwardly from its unflexed condition in response to an internal pressure rise, thereby pulling axially outwardly on said web, and to contract in response to an internal pressure fall, thereby pulling radially inwardly on said web, and,
   a continuous internal seal lip on said web located radially inboard of said port and engaged closely with said hub inner surface when said cap is in its unflexed condition, thereby blocking said interior space from said venting port,
   whereby, when said internal pressure rises, said outwardly bulging inner wall bends said annular web axially outwardly about said fixed outer wall, thereby bending said seal lip away from said hub inner surface to open said venting port, and when said internal pressure falls, said radially contracting inner wall stretches said annular web radially inwardly from said outer wall, thereby pulling said seal lip radially inwardly from said hub inner surface to open said venting port.

* * * * *